United States Patent
Polyakov et al.

(10) Patent No.: US 11,036,862 B2
(45) Date of Patent: Jun. 15, 2021

(54) DYNAMIC APPLICATION DEPLOYMENT IN TRUSTED CODE ENVIRONMENTS

(71) Applicant: VMware, Inc., Palo Alto, CA (US)

(72) Inventors: Alexey Polyakov, Sammish, WA (US); Ondrej Stastny, Kirkland, WA (US); David Field, Seattle, WA (US); Tomas Vetrovsky, Mercer Island, WA (US); Ahmad Bilal, Renton, WA (US)

(73) Assignee: VMware, Inc., Palo Alto, CA (US)

( * ) Notice: Subject to any disclaimer, the term of this patent is extended or adjusted under 35 U.S.C. 154(b) by 221 days.

(21) Appl. No.: 16/200,123

(22) Filed: Nov. 26, 2018

(65) Prior Publication Data

US 2020/0167473 A1    May 28, 2020

(51) Int. Cl.
| | |
|---|---|
| *G06F 21/57* | (2013.01) |
| *G06F 21/51* | (2013.01) |
| *G06F 21/54* | (2013.01) |
| *G06F 21/12* | (2013.01) |
| *G06F 21/16* | (2013.01) |
| *G06F 21/56* | (2013.01) |

(52) U.S. Cl.
CPC .......... *G06F 21/572* (2013.01); *G06F 21/121* (2013.01); *G06F 21/16* (2013.01); *G06F 21/51* (2013.01); *G06F 21/54* (2013.01); *G06F 21/56* (2013.01); *G06F 21/562* (2013.01); *G06F 21/565* (2013.01)

(58) Field of Classification Search
CPC ...... G06F 21/572; G06F 21/121; G06F 21/16; G06F 21/51; G06F 21/54; G06F 21/57; G06F 21/12; G06F 21/56; G06F 21/562; G06F 21/565
See application file for complete search history.

(56) References Cited

U.S. PATENT DOCUMENTS

| | | | | |
|---|---|---|---|---|
| 6,973,647 B2 * | 12/2005 | Crudele | ................... | G06F 8/61 |
| | | | | 717/177 |
| 8,950,007 B1 * | 2/2015 | Teal | ....................... | G06F 21/57 |
| | | | | 726/30 |
| 2006/0149968 A1 * | 7/2006 | Edery | .................. | H04L 63/145 |
| | | | | 713/181 |
| 2012/0291030 A1 * | 11/2012 | Fitzgerald | .............. | G06F 21/53 |
| | | | | 718/1 |
| 2013/0067577 A1 * | 3/2013 | Turbin | .................... | G06F 21/56 |
| | | | | 726/24 |
| 2013/0097654 A1 * | 4/2013 | Aciicmez | ............... | G06F 21/62 |
| | | | | 726/1 |

(Continued)

*Primary Examiner* — Jayesh M Jhaveri
(74) *Attorney, Agent, or Firm* — Thomas | Horstemeyer LLP

(57) ABSTRACT

Disclosed are various examples for dynamic application deployment in trusted code environments. In some embodiments, an application is identified for installation on a client device. The client device includes a security process that limits the client device to execute trusted code based on a trusted code policy. Characteristics of a file are identified from an installation package for a client application. A management agent is instructed to update the trusted code policy to whitelist the file by providing the characteristics of the executable file to the security process. A command to install the application is transmitted to the management agent, where the management agent is a trusted installer for the client device.

17 Claims, 6 Drawing Sheets

(56) References Cited

U.S. PATENT DOCUMENTS

| | | | |
|---|---|---|---|
| 2015/0121357 A1* | 4/2015 | Ha | G06F 21/6218 |
| | | | 717/168 |
| 2016/0239510 A1* | 8/2016 | Nagorny | G06F 16/951 |
| 2017/0149886 A1* | 5/2017 | Shetty | G06F 3/0619 |
| 2017/0237754 A1* | 8/2017 | Todorovic | H04L 9/3247 |
| | | | 713/156 |
| 2017/0351862 A1* | 12/2017 | Mohinder | G06F 21/57 |

* cited by examiner

FIG. 5A

Device Management Console 121      🔍 ⓐ ⭐ ⓘ   User Name ˅

Update Deployment Configuration     Save & Exit ⊗

✓ Select Devices for Update     ❷ Update Apps & Settings

Update Applications and Settings
Select Applications to Add or Remove from Selected Devices.

➤ Updated Trusted Installers
515a

Select Trusted Installer(s):

✓ ◼ Management Agent     ✓ ◼ Provider Agent

➤ Update or Install Applications     Install within Container?
515b

✓ ◼ Document Proc.     Yes | No

⚠ ⊗ ◼ Media App     N/A

✓ ◼ Email Viewer     Yes | No

[Continue]

⚠ Application Identified as Potentially Compromised

DYNAMIC APPLICATION DEPLOYMENT IN TRUSTED CODE ENVIRONMENTS

BACKGROUND

While standard business application suites can offer basic business functionality for organizations, it can be desirable to provide an increased level of custom functionality for enterprise employees and other users. As a result, enterprises can develop and deploy additional applications and updated applications that increase productivity and enterprise horizons. In addition, enterprises can desire to remove problematic or unused applications.

Organizations and other enterprises can own or otherwise employ a number of client devices for enterprise activities. The enterprises can manage the devices in order to prevent theft, data loss and unauthorized access to enterprise emails, presentations, documents and other content accessed through the devices. Device misuse can lead to device damage, data loss, or loss of productivity. In order to protect work flow and investment in devices, enterprises can employ security options that limit the prospects for misuse.

One solution can be to scan for hazardous or problematic applications that execute on a device. However, this solution can still allow a device to be compromised by new or otherwise unknown problems. In addition, current solutions can be difficult for information technology professionals to apply to existing devices. Other solutions that secure a device can be too rigid, and can prevent application updates or deployment of additional applications. As a result, the existing security solutions can be ineffective in this environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 5A and 5B are drawings illustrating functionality implemented by components of the networked environment and rendered for display.

DETAILED DESCRIPTION

Figure 1:
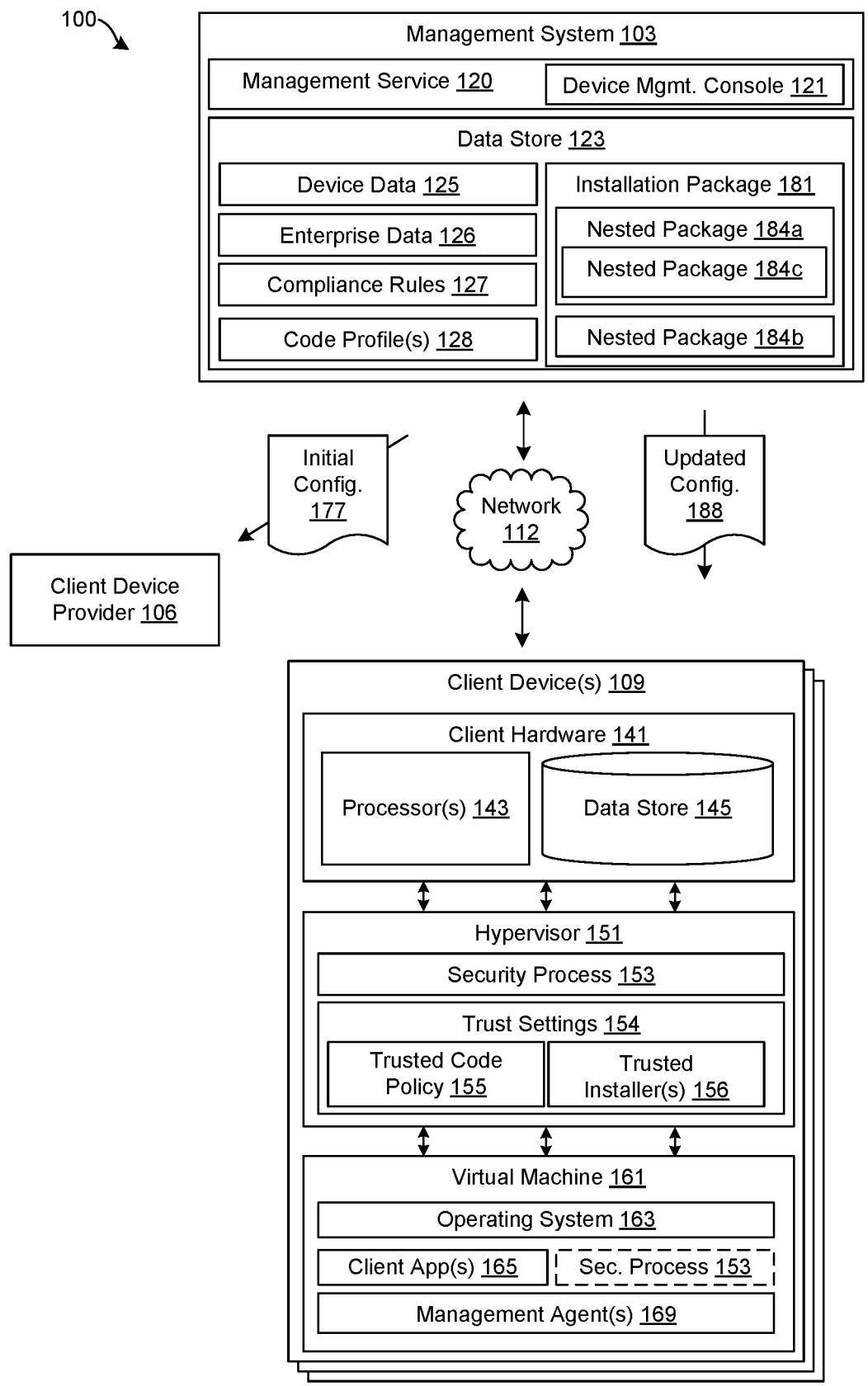
FIG. 1 is a drawing of an example of a networked environment, including a management system, a client device, and a client device provider.

The present disclosure relates to dynamic application deployment in trusted code environments. Aspects of the present disclosure can enable trusted code enforcement from the initial device delivery and throughout its life cycle. This can entail installation of an initial device configuration that includes trusted code enforcement, and deployment of updated device configurations while maintaining trusted code enforcement on the device.

As discussed in further detail below, the present disclosure includes embodiments that can identify an application for installation on a client device. The client device can include a security process that limits the client device to execute trusted code based on a trusted code policy. An installation package for the application can be unpacked to identify characteristics of a file or executable file within the installation package. Where the installation package can include a nested package that is unpacked to identify the characteristics of the file. The file can be within the nested package. Characteristics of the file can include a certificate, a file name, a file version, and a file hash. A file signature can include a number of these characteristics. A command to update the trusted code policy can be transmitted to a management agent executed in the client device. The command to update the trusted code policy can include instructions to whitelist the file by providing the characteristics of the file to the security process. A command to install the application can be transmitted to the management agent. The management agent can be a trusted installer for the client device, and can perform the installation.

In some examples, user-defined specifications can be identified through a device management console. The specifications can include an indication to enforce the trusted code policy on the client device, and an indication to permit a management agent to be a trusted installer for the client device. A command to enforce the trusted code policy on the client device can be transmitted to a provider computing device associated with a provider of the client device. A command to permit the management agent to be the trusted installer for the client device can be transmitted to the provider computing device. The provider computing device can, based on the commands, configure the client device to enforce trusted code policy and to permit the management agent as the trusted installer.

In some cases multiple client devices can be configured based on a selection of a set of client devices that includes the client device can be identified through the device management console. The device management console can identify the application for installation on the set of client devices. The command to update the trusted code can be transmitted to the set of client devices, and the command to install the application is transmitted to the set of client devices. The command to install the application can include instructions to install the application within a container of a container application.

With reference to FIG. 1, shown is an example of a networked environment 100. The networked environment 100 can include a management system 103, a client device 109, and a client device provider system 106 in communication with one another over a network 112. The components of the networked environment 100 can be utilized for installing and updating applications on the client devices 109 while maintaining trusted code policies on the devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network, and can be local to at least one of the other components of the networked environment. In other embodiments, the management system 103 can be remote from the other components, or the computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 120 as well as other applications, services, processes, systems, engines, or functionality not discussed in detail herein. The management service 120 can be stored in the data store 123 of the management system 103.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 103, mass storage resources of the management system 103, or any other storage resources on which data can be stored by the management system 103. The data stored in the data store 123 can include, for example, management data including device data 125, enterprise data 126, compliance rules 127, as well as other data.

The data stored in the data store 123 can be associated with the operation of the various applications and/or functional entities described. Client devices 109 can be identified within the device data 125 by one or more of a device identifier, a unique device identifier (UDID), a media access control (MAC) address, an internet protocol (IP) address, or another identifier that uniquely identifies a device with respect to other devices. The device data 125 can also include hardware configurations including a chipset utilized by the device, a performance or capacity, and a model identifier. The device data 125 can include software configurations, including a management agent 169 installed on the client device 109, a version of the management agent 169, and an organizational group associated with the client device 109 itself or a user of the client device 109. The device data 125 can include an enrollment status indicating whether each client device 109 is enrolled with or managed by the management service 120. A client device 109 designated as "enrolled" can be permitted to access the enterprise data 126, while a client device 109 designated as "not enrolled," or having no designation, can be denied access to the enterprise data 126.

Device data 125 can also include initial configuration 177 for a client device 109. The initial client device configuration 177 can be transmitted to the client device provider 106. The management service 120 can obtain user-specified initial configuration 177 through an administrative user interface or other a user interface of the management service 120. The management service 120 can transmit these initial configuration 177 to the client device provider 106, which can include a system or device associated with a manufacturer, retailer, merchant, or other provider of the client device 109. The initial configuration 177 can include a list of applications 165 for factory or initial installation by the provider of the client device 109. The initial configuration 177 can include a specification to enforce trusted code, as well as parameters to use in order to enforce trusted code on the client device, such as by file name, file version, file hash, certificate, and file signature. A signer of the certificate can also be specified. The initial configuration 177 can also include a specification of a single trusted installer, or multiple trusted installers to enforce on the client device 109. Device data 125 can also include an updated device configuration 188 for a client device 109. The updated device configuration 188 can be an updated configuration that includes information described with respect to the initial configuration 177. The updated configuration 188 can be transmitted to a management agent 169 on a client device 109, and the management agent 169 can cause the updated configuration 188 to be applied on the client device 109.

Additionally, device data 125 can include indications of the state of devices including the client devices 109. For instance, these indications can specify installed applications, configurations, user accounts, the physical locations, the network to which each of the devices is connected, and other information describing the current state of each of the devices. Device data 125 can also include data pertaining to user groups. An administrator can specify one or more of the client devices 109 as belonging to a user group. The user group can refer to a group of user accounts. User groups can be created by an administrator of the management service 120 such that a batch of client devices 109 can be configured according to common settings. For instance, an enterprise can create a user group for the marketing department and the sales department, where client devices 109 in the marketing department are configured differently from the client devices 109 in the sales department. The settings can include code profiles 128 to permit for execution on individual client devices 109 or user groups of client devices 109. The settings can include installation packages 181 to install on client devices 109.

Compliance rules 127 can include, for example, configurable criteria that must be satisfied for an enrolled one of the client devices 109 to be in compliance with the management service 120. The compliance rules 127 can be based on a number of factors, including geographical location, activation status, enrollment status, authentication data, time, date, and network properties, among other factors associated with each device. The compliance rules 127 can also be determined based on a user account associated with a user. Compliance rules 127 can include predefined constraints that must be met in order for the management service 120, or other applications, to permit access to the enterprise data 126 or features of the client device 109. The management service 120 can communicate with management agent 169 or other applications to determine whether states exist on the client device 109 that do not satisfy one or more compliance rules 127. States can include, for example, a virus or malware being detected on the device; violation of a baseline or verified behavior profile; installation or execution of a blacklisted application; and a device being "rooted" or "jailbroken," where root access is provided to a user of the device. Additional states can include the presence of particular files, questionable device configurations, vulnerable versions of applications, or other vulnerability, as can be appreciated.

The management service 120 can oversee the management of the client devices 109. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein. The management service 120 can generate and provide a device management console or user interface 121 for management of the client devices 109. The user interface of the management service 120 can be accessed using a computing device that connects to a network site provided by the management service 120. The management service 120 can provide a user interface for setting and viewing alerts and notifications for a client device 109.

The management service 120 can generate code profile 128 for a particular application 165 based on the installation package 181 for the applications 165. Generation of a code profile 128 can include expansion of nested packages 184a, 184b, and 184c in an installation package 181 of the client application 165. Once expanded, executables and other files within installation package 181 can be analyzed to identify characteristics or parameters of each file that can be provided to the security process 153 in order to whitelist the file. The management service 120 can analyze a file to identify expected characteristics including an expected file name, expected file version, and expected file certificate. An expected signer of the certificate can also be identified. The management service 120 can also generate an expected hash of a file by inputting the file into a hash function such as a secure hash algorithm (SHA) to output the hash of the actual file. The hash function can be MD5, SHA-1, SHA-2, SHA-3, BLAKE2, or another cryptographic hash function. The expected file name, expected file version, expected file certificate, and expected file hash can form an expected file signature of the file. The code profile 128 for an application 165 can include a number of expected file signatures or a number of expected file names, expected file versions, expected file certificates, and expected file hashes for files of the application 165. Alternatively, the management agent 169 can download the installation package 181 and perform this process on the client device 109, and update the trusted code policy 155, prior to installation of the installation package 181.

Once included in a trusted code policy, the code profile 128 for a particular application 165 can cause the security process 153 to permit files of the application 165 to execute, or allow other applications to execute code included in the files. This can permit the applications 165 to operate properly on the client device 109. The management service 120 can generate a trusted code policy 155 based on one or more code profiles 128. The management service 120 can cause the client device 109 or a group of client devices 109 to update trusted code policy 155 by transmitting, to the management agent 169, a command to update the trusted code policy 155. The command can include one or more trusted code profile 128, or can include a trusted code policy 155.

The management service 120 can also request that the client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM).

For example, the management service 120 can transmit a request to the notification service, which requests that the client device 109 check-in with the management service 120. The notification service can push or otherwise route a notification to the client device 109. Once the notification is received, the management agent 169 can cause the client device 109 to check-in with the management service 120. The management agent 169 can determine whether a command queue provided by the management service 120 for the respective client device 109 contains any commands or resources for the client device 109, for example, a command to install an installation package 181, or a command to update a trusted code policy 155 based on a code profile 128. A command to install the installation package 181 can include a network address or URL where the installation package 181 can be downloaded for installation. A command to update a trusted code policy 155 can include a network address or URL where the code profile 128, or an updated trusted code policy 155, can be downloaded for installation. The management agent 169 can cause the commands or resources to be downloaded and/or implemented on the client device 109.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system 163 that can perform functionalities and execute applications. The operating system 163 can be stored in a data store 145 that also includes client applications 165, a client management application 139, and other data. The client device 109 can execute the client management application 139 to perform or access the functionality described for the management service 120.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system 163 of the client device 109 can be configured to execute various client applications 165, such as a client management application 139, a browser application, or another application. The operating system 163 and some client applications 165 can access network content served up by the management system 103, or other servers, thereby rendering a user interface on a display, such as a liquid crystal display (LCD), organic light emitting diode (OLED) display, touch-screen display, or other type of display device. In some cases the operating system 163 of the client device 109 can provide a security process 153. In other cases, the security process 153 can be provided separately from the operating system 163. In some examples, the operating system can include a WINDOWS® operating system, and the security process 153 can include WINDOWS® Device Guard.

To this end, some client applications 165 can include a browser or a dedicated application, and a user interface can include a network page, an application screen, or other interface. The client device 109 can also access web applications using the browser application. Further, other client applications 165 can include device management applications, enterprise applications, social networking applications, word processors, spreadsheet applications, media player applications, or other applications. The client management application 139 can be an application that performs certain functions in the enrollment of the client device 109 and updating of applications 165 on the client device 109. The client management application 139 can perform actions as directed by the management service 120, for instance, by checking in with the management service 120, retrieving a command from the command queue, and implementing the command as discussed above.

The client device 109 can include a hypervisor 151. The hypervisor 151 can have components including a security process 153 and other processes or applications that are installed in, and execute from, the hypervisor 151. In some cases, the hypervisor 151 and its components, including the security process 153, can include a component that executes in a kernel mode or another privileged mode with respect to the client hardware 141 of the client device 109. The security process 153 can also include a component that executes with the virtual machine 161. The components of the security process 153 can work in concert. The management agent 169 can provide updated profiles and policies to the security process 153 executed within the virtual machine 161, or can deliver the profiles and polices to the security process 153 executed within the hypervisor 151. The operating system 163 or security process 153 can provide an API that the management agent 169 can invoke to deliver the profiles and polices to the security process 153. The data store 145 can store the security process 153 and the trusted code policy 155, as well as a virtual machine 161, an operating system 163, client applications 165, and management agent 169.

The hypervisor 151 can be a bare metal or native hypervisor that has direct access to the client hardware 141. In other cases, the hypervisor 151 can be a hosted hypervisor that is installed and executed as an application in a host operating system 163. The hypervisor 151 can execute the virtual machine 161 of the client device 109. The hypervisor 151 can execute one or more virtual machine 161. The hypervisor 151 can snapshot, suspend, quarantine, resume, power on, and power off the virtual machine 161.

The virtual machine 161 can access the client hardware 141 through the hypervisor 151 and virtualize or emulate a computer system of the client device 109. The virtual machine 161 can execute an operating system 163 and client applications 165. The operating system 163 can be an operating system of the client device 109. The client applications 165 can be processes or applications that an administrator of the client device 109 has selected for initial installation from the factory or other client device provider 106, or applications that an administrator of the client device 109 has selected for a live update of the client device 109.

The management agent 169 can receive a code profile 128 or a trusted code policy 155 from the management service 120. The management agent 169 can establish or update the trusted code policy 155 by providing the trusted code policy 155, or the code profile 128 to the security process 153a and/or 153b. Once the trusted code policy 155 is updated, the security process 153 can enforce the trusted code policy 155. For example, as a component installed in the hypervisor 151, the security process 153 can have access to network communications of the client device 109, as well as the client applications 165 of the virtual machine 161. Also, where the hypervisor 151 is a native hypervisor in a privileged mode, the security process 153 can also be in a privileged mode. This can prevent alteration of the security process 153, as user mode code and processes can be prevented from access to the privileged mode memory location of the security process 153.

The security process 153 can analyze an actual file on the client device, for example, an actual file that includes executable code. The security process 153 can identify an actual file name, actual file version, actual file certificate for the actual file. The security process 153 can compare these parameters to the expected file name, expected file version, expected file certificate described in the trusted code profile 155. The security process 153 can generate a hash of an actual file by inputting the actual file into a hash function such as a secure hash algorithm (SHA) to output the hash of the actual file. The hash function can be MD5, SHA-1, SHA-2, SHA-3, BLAKE2, or another cryptographic hash function. The security process 153 can compare an actual file hash to an expected file hash from the trusted code policy 155. The expected file signature can be compared to an expected file signature that includes these parameters. An anomaly in any of the parameters can indicate that the code or content of the file differs from a verified or expected file from the trusted code policy 155. Once an anomaly is detected, the security process 153 can prevent the file from executing and prevent code within the file from being executed on the client device.

The security process 153 can include one or more security applications or programs of the client device 109, which can protect operation of the client device 109 according to the trust settings 154. For example, the security process 153 can enforce execution of trusted code, as described in trusted code policy 155, on the client device 109. Enforcing trusted code can permit the client device 109 to execute only trusted code as described in the trusted code policy 155, while code that is not described in the trusted code policy 155 can be prevented from execution. Trusted code can include applications, installable files, and executable files described in the trusted code policy 155. The security process 153 can also include instructions that permit only a single trusted installer 156 or multiple trusted installers 156, to install client applications 165 to the client device 109. The management agent 169 can be a sole trusted installer 156. In other cases, applications 165 or agent application of the client device provider 106 can also be included as a trusted installer 156. Applications not described in a list or specification of the trusted installers 156, can be prevented from installing other client applications 165.

The management agent 169 can also install an application 165 in a container. A container for an application 165 can specify memory areas or addresses that are accessible by the application 165. Memory addresses can be used to apply application whitelists and blacklists. Accordingly, accessible or restricted client application memory addresses for various applications 165 can be specified for the container of a particular application 165. Other memory addresses, such as system memory addresses, can also be specified as accessible or restricted for the application 165 by its container. An administrator can specify, through a device management console 121 of the management service 120, for an application 165 to be installed in a container. The management service 120 can include, within a command to install the application 165, instructions for the management agent 169 to install the application 165 in a container. The instructions can also include container parameters including whitelisted or blacklisted memory addresses for the container. The instructions can also indicate a proxy server address or network address that is specified for particular type of command sent from the container, so that communications of that type are proxied through a particular proxy server or endpoint.

Figure 2:
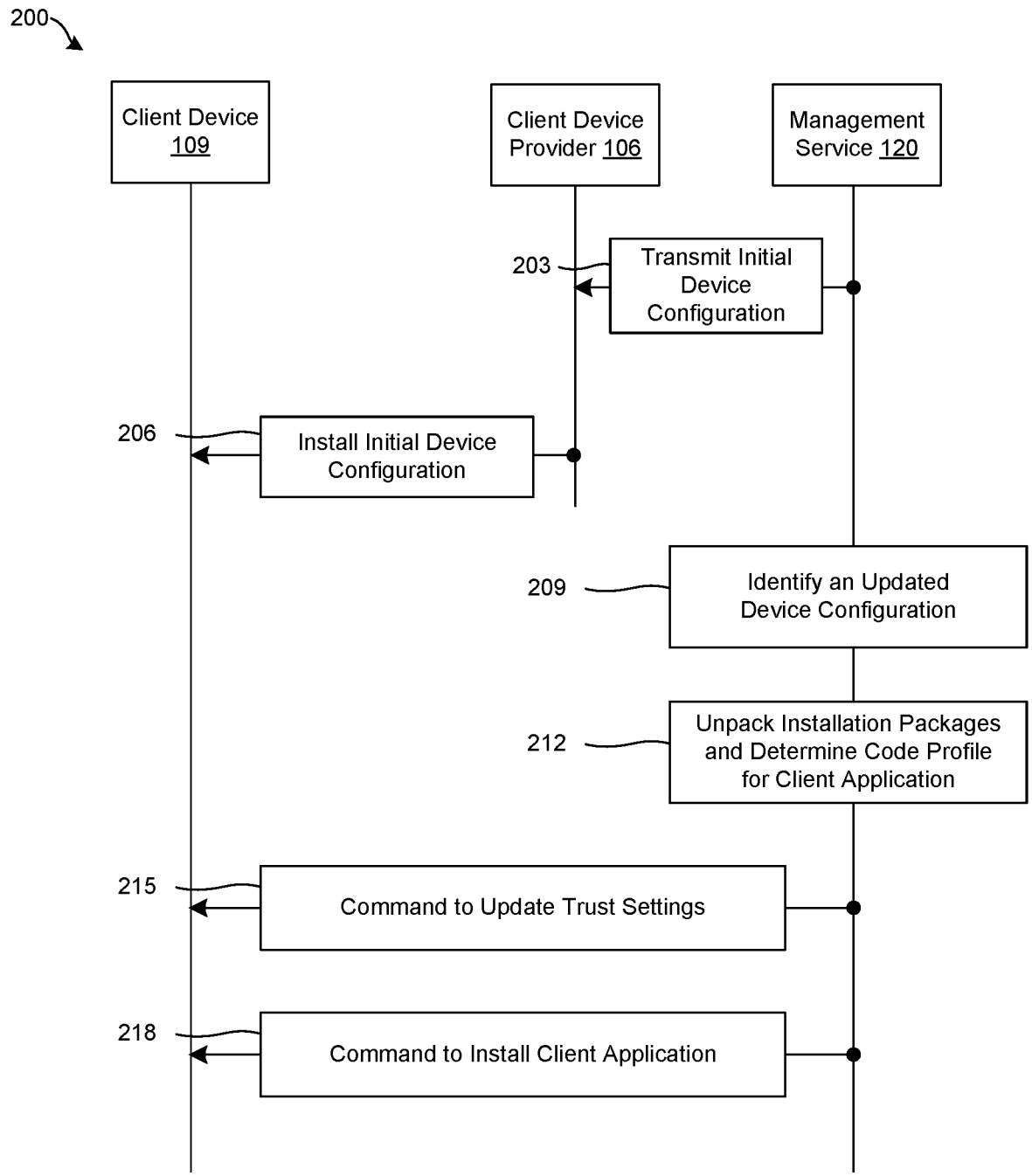
FIG. 2 is an example sequence diagram illustrating functionality implemented by components of the networked environment.

In FIG. 2, shown is an example sequence diagram 200 describing steps that can be performed by the components of the networked environment 100. Generally, the sequence diagram 200 describes how the components can install an initial device configuration to the client device 109 and provide for updates to the configuration and applications while maintaining trusted code enforcement on the device.

In step 203, the management service 120 can transmit, to the client device provider 106, a request to install an initial device configuration 177 on the client device 109 or a group of client devices 109. The management service 120 can store a URL or other network address of the client device provider 106, and can transmit the request to install the initial device configuration 177 to the network address. The request can include the initial device configuration 177 and a device identifier of each client device 109. The request can be authenticated using respective certificates of the client device provider and the management service 120. The initial configuration 177 can include a list of applications 165 for factory or initial installation by the provider of the client device 109. The initial configuration 177 can include a specification to enforce trusted code, along with parameters to use in order to enforce trusted code on the client device 109, such as by file name, file version, file hash, certificate, or file signature. The initial configuration 177 can also include a specification of a single trusted installer, or multiple trusted installers to enforce on the client device 109. The management service 120 can generate a device management console or user interface 121 that identifies an the initial device configuration 177 based on user inputs from an administrator or another user. The management service 120 can employ a web application or network site that includes the user interface.

In step 206, in response to the request, the client device provider 106 can install the initial device configuration 177 on the specified client device 109 or set of client devices 109. The client device provider 106 can include a system or device associated with a manufacturer, retailer, merchant, or other provider of the client devices 109. Factory or origin enabling enforcement of trusted code on the client device 109, for example, before deployment or use of the client device 109, or after a factory reset of the device, can increase the security of the device. If the client device 109 has been used before enforcing trusted code, unsafe code may be improperly whitelisted or identified as acceptable to run. Further, the client device 109 has to be scanned to identify the attributes of its files, which can be time consuming. However, where trusted code is enforced before the client device is deployed for use by enterprise users, the whitelisted or trusted code can be more reliable and more efficient than existing techniques that are based on scanning each. As a result, the process can be faster and more efficient, as each client device 109 can include the same set of applications and configurations, as specified in the initial device configuration 177. The initial trusted code policy 155 can be determined or generated once, such that the applications in the initial device configuration 177 can execute successfully. A single initial trusted code policy 155 can be utilized for each client device 109 that includes the same initial device configuration 177.

In step 209, the management service 120 can identify an updated device configuration 188 for the client device 109 or group of client devices 109. For example, the management service 120 can generate the user interface to obtain or receive, from an administrator, the updated device configuration 188. The updated device configuration can include any of the items discussed regarding the initial device configuration 177. The management service 120 can work in concert with the management agent 169 and the security process 153 to install new client applications 165, and update existing client applications 165 so that they can function properly, while maintaining enforcement of whitelisted or trusted code. To achieve this, the trusted code policy 155 can be regenerated and updated to maintain enforcement of trusted code. Undesired applications, for example, those that are no longer used by the enterprise, or those that the management service 120 has identified as unsafe or compromised, can be removed from the trusted code policy 155 so that they cannot be executed on the client device 109. Any of the settings or configurations discussed can also be updated.

In step 212, the management service 120, or the client device 109, can generate a code profile 128 or updated code profile 128 for a particular application 165 identified in the updated device configuration 188. In some cases, the application 165 can be an updated version of an application 165. The ability to update applications while maintaining trusted code enforcement can increase flexibility for enterprise users while securing the device 109 from compromise. The management service 120 can identify and download an installation package 181 for an application 165 identified in the updated device configuration 188. The management service 120 can generate the code profile 128 for the application 165 based on the installation package 181. This can include unpacking or expansion of nested packages 184a, 184b, and 184c from the installation package 181. The installation package 181 and nested packages 184 can include a complex nested structure that includes .msi, .exe, .cab, .apk, .app, .bin, .cmd, .com, and other types of files. Some of the file types can include additional files nested in the structure. The contents of these files can require expansion or extraction in order to properly identify their attributes for trusted code enforcement. Once expanded, executables and other files within installation package 181 can be analyzed to identify aspects or parameters of each file. The management service 120 can analyze a file to identify an expected file name, expected file version, and expected file certificate. The management service 120 can also generate an expected hash of a file by inputting the file into a hash function such as a secure hash algorithm (SHA) to output the hash of the actual file. The hash function can be MD5, SHA-1, SHA-2, SHA-3, BLAKE2, or another cryptographic hash function. The expected file name, expected file version, expected file certificate, and expected file hash can form an expected file signature of the file. The code profile 128 for an application 165 can include a number of expected file signatures or a number of expected file names, expected file versions, expected file certificates, and expected file hashes for files of the application 165. Alternatively, the management agent 169 can download the installation package 181 and perform this process on the client device 109, and update the trusted code policy 155, prior to installation of the installation package 181.

In step 215, the management service 120 can transmit, to the client device 109, a command to update the trust settings 154 that are enforced on the client device 109. The command can specify trust settings 154 that include a new or updated code profile 128, an updated trusted code policy 155, a trusted installer 156, and a specification of the characteristics or parameters that identify trusted code. A command to update the trust settings 154 can be authenticated using a management service certificate or another certificate. A command to update the trust settings 154 can include an updated trusted code policy 155 that includes a set of all trusted code permitted to execute on the client device 109. The command to update the trusted code policy 155 can include instructions for the management agent 169 to deliver the updated trust settings 154 to the security process 153, for example, using an operating system API or another API of the client device 109. In some cases, the instructions can identify a transport, method, or module that can deliver updated trust settings 154 from user space to kernel space. The security process 153 can whitelist the files or executable files of the client application 165 based on the expected characteristics.

In step 218, the management service 120 can transmit, to the client device 109, a command to install or update a client application 165 specified in the updated device configuration 188. The management agent 169 can be a trusted installer 156, and can install or update the client application 165. The trust settings 154 can by this point be updated to include code profiles 128 that with parameters for all files, or all files including executable code, that are nested within the installation package 181 and nested packages 184. As a result, the client application 165 can be installed or updated successfully while maintaining both enforcement of trusted code and proper functionality of the client application 165.

Figure 3:
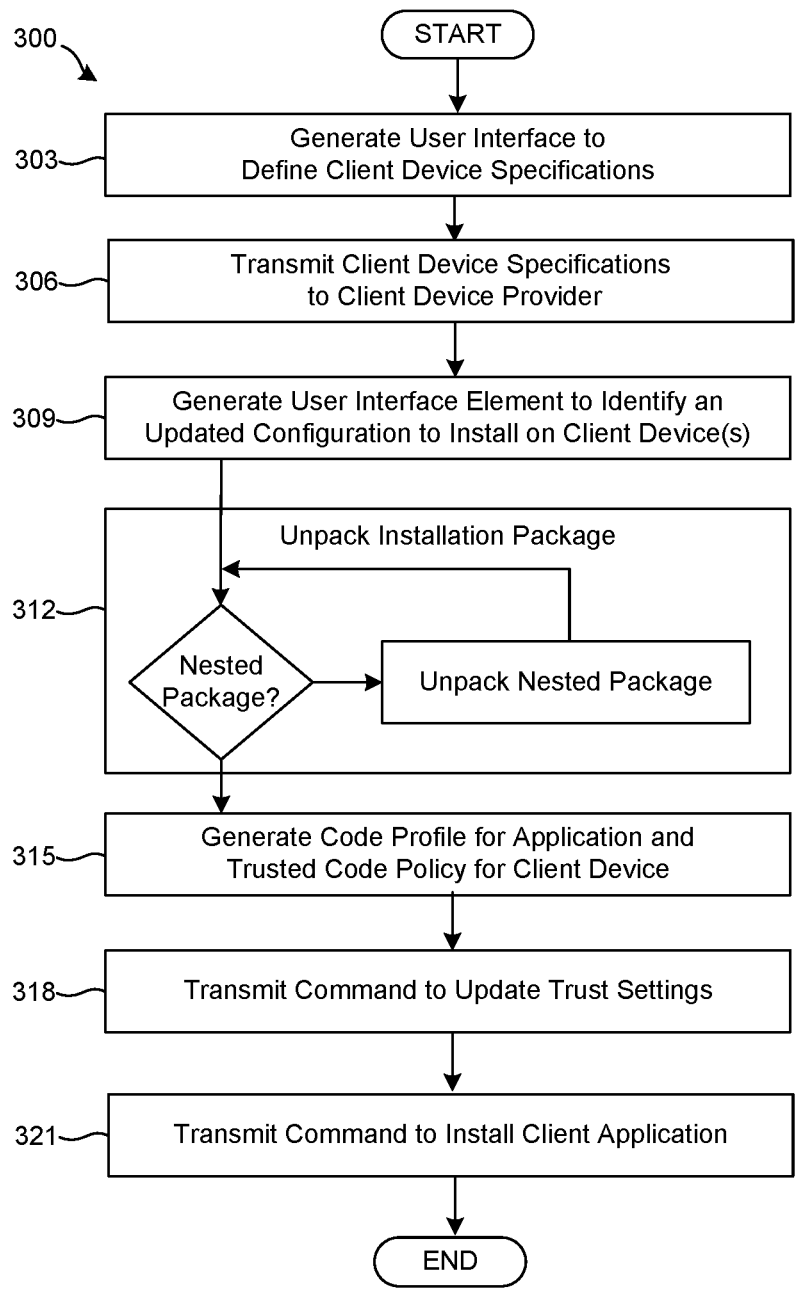
FIGS. 3, 4A, and 4B are example flowcharts illustrating functionality implemented by components of the networked environment.

FIG. 3 shows an example flowchart 300 describing steps that can be performed by instructions executed by the management service 120. Generally, the flowchart 300 describes how the management service 120 can oversee a process to install an initial device configuration to the client device 109, as well as apply an updated device configuration 188 while maintaining trusted code enforcement on the device.

In step 303, the management service 120 can generate a device management console or user interface 121 that identifies the initial device configuration 177 from a user. The management service 120 can generate a web application or network site that includes the user interface. A user can log in with the management service and interact with the user interface to input a user-specified initial device configuration 177. The device management console 121 can include a prompt to select a single device or multiple devices upon which to install the initial device configuration 177. For example, the device management console 121 can include a list of client devices 109 to purchase from the client device provider 106, or a list of client devices 109 that have been purchased from the client device provider 106. The device management console 121 can provide user interface elements that allow a user to select client devices 109 according to device type, management group, or individual devices.

The device management console 121 can also include a user interface element that, when selected, causes the client devices 109 to enforce trusted code on the device from the factory or provider 106. The device management console 121 can provide a respective user interface element that enables or disables file name enforcement, file version enforcement, file hash enforcement, certificate enforcement, or file signature enforcement based on a file signature comprising the file name, file hash, file version, and certificate.

The device management console 121 can also generate elements that identify a selection of a trusted installer 156 for the client device 109. The security process 153 can permit trusted installer 156 to perform installations on the client device 109 while other programs are prevented from performing installations on the client device 109. In order to increase security, the management agent 169 can be selected as the sole trusted installer 156 for the client device 109. In other cases, multiple trusted installers 156 can be selected, and an agent application of the client device provider 106 can also be enabled as a trusted installer 156. The device management console 121 can also generate elements that identify a selection of client applications 165 to install on the client device 109. The management service 120 or device management console 121 can generate an initial device configuration 177 based on the selections obtained through the device management console 121.

In step 306, the management service 120 can transmit, to the client device provider 106, a request to install the initial device configuration 177 on the client device 109 or group of client devices 109. The management service 120 can store a URL or other network address of the client device provider 106, and can transmit the request to install the initial device configuration 177 to the network address. The request can include the initial device configuration 177 and a device identifier of each client device 109. The request can be authenticated using respective certificates of the client device provider and the management service 120. The initial configuration 177 can include a list of applications 165 for factory or initial installation by the provider of the client device 109. The initial configuration 177 can include a specification to enforce trusted code, along with parameters to use in order to enforce trusted code on the client device 109, such as by file name, file version, file hash, certificate, or file signature. The initial specifications 177 can also include a specification of a single trusted installer, or multiple trusted installers to enforce on the client device 109.

In step 309, the management service 120 can identify an updated device configuration 188 for the client device 109 or group of client devices 109. For example, the management service 120 can generate the user interface to identify the updated device configuration 188. The updated device configuration 188 can include any of the items discussed regarding the initial device configuration 177. The management service 120 can work in concert with the management agent 169 and the security process 153 to install new client applications 165, and update existing client applications 165 so that they can function properly, while maintaining enforcement of whitelisted or trusted code. To achieve this, the trusted code policy 155 can be regenerated and updated to maintain enforcement of trusted code. Undesired applications, for example, those that are no longer used by the enterprise, or those that the management service 120 has identified as unsafe or compromised, can be removed from the trusted code policy 155 so that they cannot be executed on the client device 109. The device management console 121 can show an alert or notification in association with unsafe, compromised or potentially problematic applications. Any of the other settings or configurations discussed can also be updated.

In step 312, the management service 120 can unpack or expand the installation package 181 of a client application 165 that is specified in the updated device configuration 188. The management service 120 can determine whether the installation package 181 includes any nested packages 184, and can unpack the nested package 184. The management service can then determine if any of the unpacked files include additional nested packages 184, and so on. This process can allow all files of the installation package 181 to be analyzed for inclusion in the trusted code policy 155. This can allow the client application 165 to execute properly on the client device 109.

In step 315, the management service 120 can generate a code profile 128 or updated code profile 128 for the application 165 identified in the updated device configuration 188. In some cases, the application 165 can be an updated version of an application 165. Files within installation package 181 can be analyzed to identify aspects or parameters of each file. The management service 120 can analyze a file or executable file to identify an expected file name, expected file version, and expected file certificate. The management service 120 can also generate an expected hash of a file by inputting the file into a hash function such as a secure hash algorithm (SHA) to output the hash of the actual file. The hash function can be MD5, SHA-1, SHA-2, SHA-3, BLAKE2, or another cryptographic hash function. The expected file name, expected file version, expected file certificate, and expected file hash can form an expected file signature of the file. The code profile 128 for an application 165 can include a number of expected file signatures or a number of expected file names, expected file versions, expected file certificates, and expected file hashes for files of the application 165.

In step 318, the management service 120 can transmit, to the client device 109, a command to update the trust settings 154 that are enforced on the client device 109. The command can include the updated configuration 188, which can include a new or updated code profile 128, an updated trusted code policy 155, an updated trusted installer 156, and a specification of the parameters that identify trusted code. A command to update the trust settings 154 can be authenticated using a management service certificate or another certificate. A command to update the trust settings 154 can include an updated trusted code policy 155 that includes a set of all trusted code permitted to execute on the client device 109. The command to update the trusted code policy 155 can include instructions for the management agent 169 to deliver the updated trust settings 154 to the security process 153, for example, using an operating system API or another API of the client device 109. In some cases, the instructions can identify a transport, method, or module that can deliver updated trust settings 154 from user space to kernel space. A command to remove a client application 165 from a trusted code policy 155 can be transmitted to the client device 109 and implemented by the management agent 169. The command can include instructions that cause the management agent 169 to remove a code profile 128 or file parameters of a particular application 165 from the trusted code policy 155.

In step 321, the management service 120 can transmit, to the client device 109, a command to install or update a client application 165 specified in the updated device configuration 188. In some cases, a command to remove or uninstall an application can also be transmitted. The management agent 169 can be a trusted installer 156, and can install or update the client application 165. The trust settings 154 can by this point be updated to include code profiles 128 that with parameters for all files, or all files including executable code, that are nested within the installation package 181 and nested packages 184. As a result, the client application 165 can be installed or updated successfully while maintaining both enforcement of trusted code and proper functionality of the client application 165.

Figure 4A:
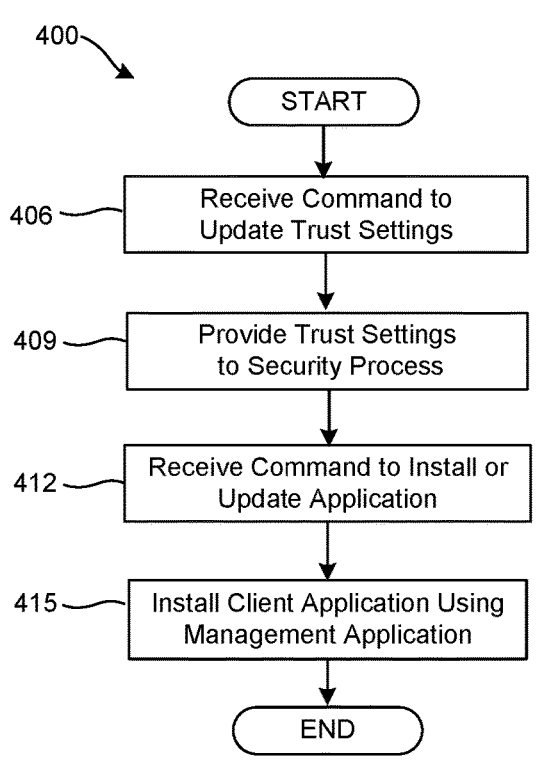

FIG. 4A shows an example flowchart 400 describing steps that can be performed by instructions executed by the client device 109. The process can be performed on the client device 109 by instructions including the management agent 169 and the security process 153. The client device 109 can be a device that has trusted code enforcement enabled. It can be difficult to update such a client device 109 to execute additional programs. Generally, the flowchart 400 describes a process to install an initial device configuration to the client device 109, as well as apply an updated device configuration 188 while maintaining trusted code enforcement on the device.

In step 406, the management agent 169 can receive, from the management service 120, a command to update the trust settings 154 that are enforced on the client device 109. The command can specify trust settings 154 that include a new or updated code profile 128, an updated trusted code policy 155, a trusted installer 156, and a specification of the parameters that identify trusted code. A command to update the trust settings 154 can be authenticated using a management service certificate or another certificate. A command to update the trust settings 154 can include an updated trusted code policy 155 that includes a set of all trusted code permitted to execute on the client device 109.

In step 409, the management agent 169 can provide the trust settings 154 to the security process 153. The management agent 169 can deliver the updated trust settings 154 to the security process 153, for example, by invoking an operating system API or another API of the client device 109. The management agent 169 can deliver the updated trust settings 154 to the security process 153 by utilizing a transport, method, or module that can deliver updated trust settings 154 from user space to kernel space. In other cases, the management agent 169 can provide the trust settings 154 to the security process 153 in user space, and a user space module of the security process 153 can deliver updated trust settings 154 to a kernel space module of the security process 153. The trust settings 154 can include the code profile 128 or file parameters for the files of the client application 165.

In step 412, the management agent 169 can receive, from the management service 120, a command to install or update a client application 165. In some cases, a command to remove or uninstall an application can also be transmitted. The command can be authenticated using a management service certificate or another certificate. The command to install the client application 165 can include a URL or network address where an installation package 181 for the client application 165 can be downloaded. The management agent 169 can download the installation package 181 for the client application 165.

In step 415, the management agent 169 can install or update the client application 165. The management agent 169 can be a trusted installer 156. As a result, the security process can allow the trusted installer 156 to install the client application 165. In addition, the executable files of the client application 165 can be allowed to execute because the code profile 128 or file parameters for the files of the client application 165 have been provided to the security process 153.

Figure 4B:
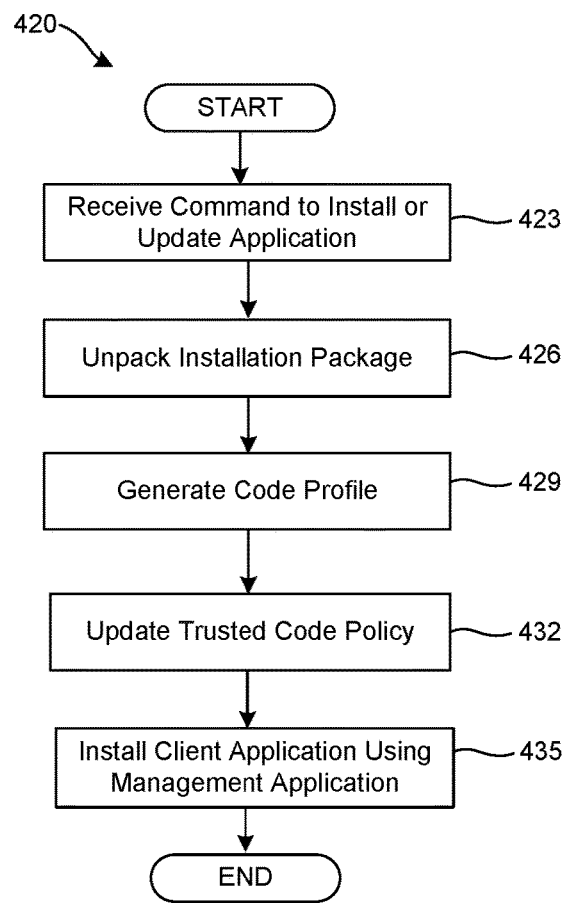

FIG. 4B shows an example flowchart 420 describing steps that can be performed by instructions executed by the client device 109. The process can be performed on the client device 109 by instructions including the management agent 169 and the security process 153. The client device 109 can be a device that has trusted code enforcement enabled. It can be difficult to update such a client device 109 to execute additional programs. Generally, the flowchart 420 describes a process to install an initial device configuration to the client device 109, as well as apply an updated device configuration 188 while maintaining trusted code enforcement on the device.

In step 423, the management agent 169 can receive, from the management service 120, a command to install or update a client application 165. In some cases, a command to remove or uninstall an application can also be transmitted. The command can be authenticated using a management service certificate or another certificate. The command to install the client application 165 can include a URL or network address where an installation package 181 for the client application 165 can be downloaded. The management agent 169 can download the installation package 181 for the client application 165.

In step 426, the management agent 169 can unpack or expand the installation package 181. The management service 120 can determine whether the installation package 181 includes any nested packages 184, and can unpack the nested package 184. The management agent 169 can determine if any of the unpacked files include additional nested packages 184, and so on. This process can allow all files of the installation package 181 to be analyzed for inclusion in the trusted code policy 155. This can allow the client application 165 to execute properly on the client device 109.

In step 426, the management agent 169 can generate a code profile 128 or updated code profile 128 for the client application 165. Files within installation package 181 can be analyzed to identify aspects or parameters of each file. The management agent 169 can analyze a file or executable file to identify an expected file name, expected file version, and expected file certificate. The management agent 169 can also generate an expected hash of a file by inputting the file into a hash function such as a secure hash algorithm (SHA) to output the hash of the actual file. The hash function can be MD5, SHA-1, SHA-2, SHA-3, BLAKE2, or another cryptographic hash function. The expected file name, expected file version, expected file certificate, and expected file hash can form an expected file signature of the file. The code profile 128 for an application 165 can include a number of expected file signatures or a number of expected file names, expected file versions, expected file certificates, and expected file hashes for files of the application 165. In some cases, the management agent generates an updated trusted code policy 155 that includes the code profile 128, or parameters of the files of the client application 165.

In step 432, the management agent 169 can update the trusted code policy 155 enforced by the security process 153. To this end, the management agent 169 can deliver the code profile 128, parameters of the files of the client application 165, or an updated trusted code policy 155 to the security process 153 as discussed. The management agent 169 can update the trusted code policy 155 by invoking an API, method, or module that can update the settings of the trust settings 154 enforced by the security process 153.

In step 435, the management agent 169 can install or update the client application 165. The management agent 169 can be a trusted installer 156. As a result, the security process can allow the trusted installer 156 to install the client application 165. In addition, the executable files of the client application 165 can be allowed to execute because the code profile 128 or file parameters for the files of the client application 165 have been provided to the security process 153.

Figure 5A:
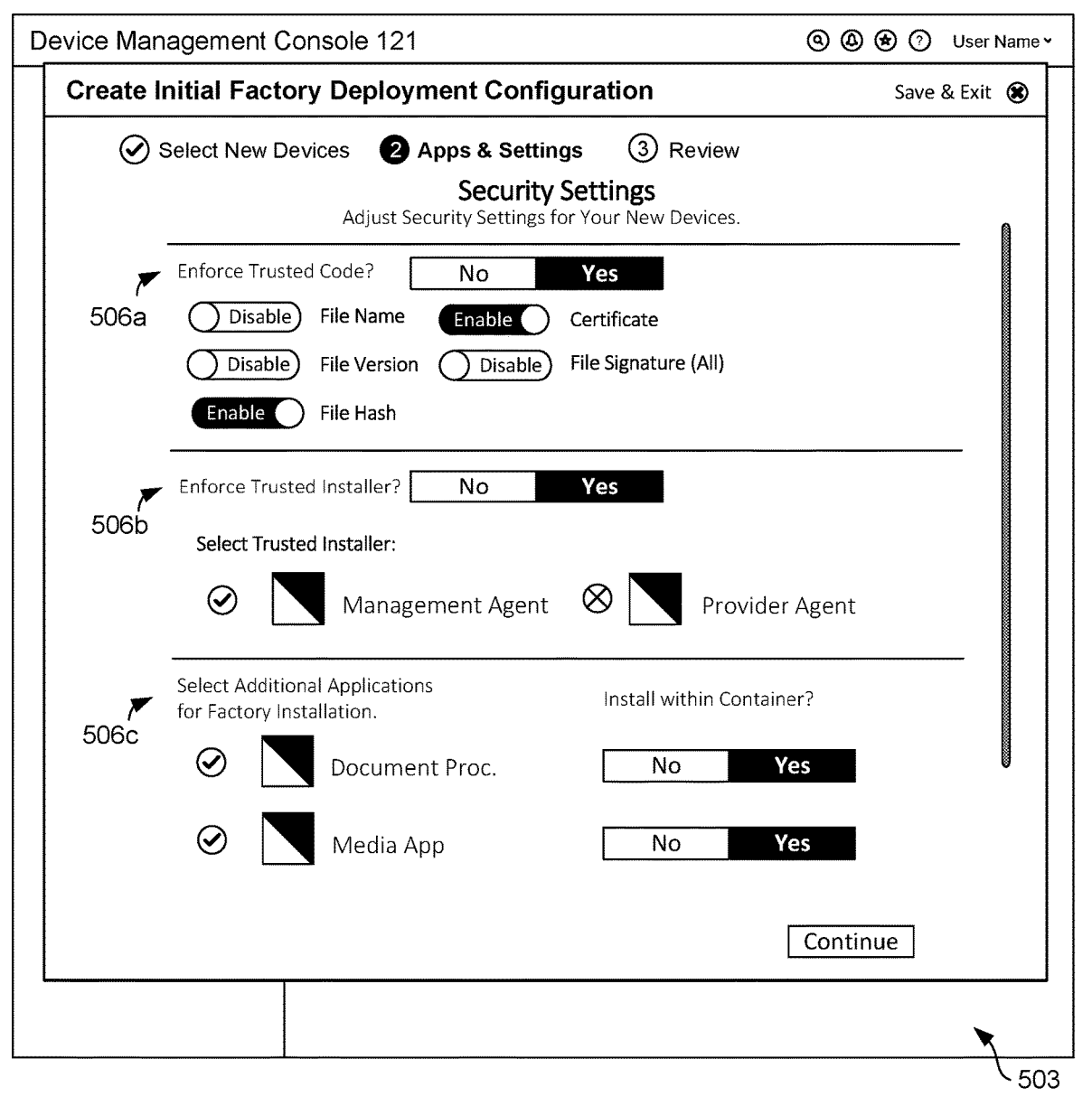

FIG. 5A shows an example of a user interface 503 generated by the device management console 121 of the management service 120, and rendered for display. The management service 120 can provide access to the device management console 121 through a web application or network site. A user can log in with the management service 120 and interact with the user interface to input a user-specified initial device configuration 177. The user interface 503 can include panels or section 506a, 506b and 506c. The user interface 503 can, for example in 506a, include a user interface element that, when selected, causes the client devices 109 to enforce trusted code on the device from the factory or provider 106. Section 506a can also include a respective user interface element that enables or disables file name enforcement, file version enforcement, file hash enforcement, certificate enforcement, or file signature enforcement based on a file signature comprising the file name, file hash, file version, and certificate. Section 506b can include a user interface element that, when selected, identifies an indication to enable or enforce a trusted installer. Section 506b can also include elements that identify a selection of a trusted installer 156 for the client device 109. Section 506c can include elements that identify a selection of client applications 165 to install on the client device 109. Section 506c can include, for each application, an element that identifies whether to install the application within a container. The management service 120 or device management console 121 can generate an initial device configuration 177 based on the selections obtained through the device management console 121.

FIG. 5B shows an example of a user interface 509 generated by the device management console 121 of the management service 120, and rendered for display. The user interface 509 can provide user interface elements to generate an updated device configuration based on selections identified through the device management console 121. The user interface 509 can include panels or section 515a and 515b. Section 515a can include user interface elements that can identify updated trusted installers 156. Section 515b can include user interface elements that can identify client applications 165 to install or update. The device management console 121 can also show an alert or notification in association with unsafe, compromised or potentially problematic applications. Any of the other settings or configurations discussed can also be updated.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by applications 165, management service 120, or another application can be rendered. In some examples, the user interface can be generated with user interface data provided by the management system 103. The client devices 109 can also include one or more input/output devices that can include, for example, a capacitive touchscreen or other type of touch input device, fingerprint reader, or keyboard.

Although the management service 120, client applications 165, and other functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
    at least one computing device; and
    a data store comprising executable instructions, wherein the instructions, when executed by at least one processor, cause the at least one computing device to at least:
        generate a device management console that identifies an application for installation on a client device, wherein the client device comprises a security process that limits the client device to execute trusted code based on a trusted code policy;
        unpack an installation package for the application to identify characteristics of a file within the installation package, wherein the installation package comprises a nested package that is unpacked to identify the characteristics of the file, the file being within the nested package;
        transmit, to a management agent executed in the client device, a command to update the trusted code policy, the command to update the trusted code policy comprising instructions to whitelist the file by providing the characteristics of the file to the security process; and
        transmit, to the management agent, a command to install the application, wherein the management agent is a trusted installer for the client device.

2. The system of claim 1, wherein the instructions, when executed by the at least one processor, cause the at least one computing device to at least:
    identify, through the device management console, user-defined specifications comprising: an indication to enforce the trusted code policy on the client device, and an indication to permit a management agent to be a trusted installer for the client device.

3. The system of claim 2, wherein the instructions, when executed by the at least one processor, cause the at least one computing device to at least:
    transmit, to a provider computing device associated with a provider of the client device, a command to enforce the trusted code policy on the client device, and a command to permit the management agent to be the trusted installer for the client device, wherein the provider computing device configures the client device to: enforce trusted code, and permit the management agent as the trusted installer.

4. The system of claim 1, wherein the instructions, when executed by the at least one processor, cause the at least one computing device to at least:

identify, through the device management console, a selection of a set of client devices comprising the client device; and wherein the device management console identifies the application for installation on the set of client devices, the command to update the trusted code policy is transmitted to the set of client devices, and the command to install the application is transmitted to the set of client devices.

5. The system of claim 1, wherein the characteristics of the file to the security process comprise at least one of: a certificate, a file name, a file version, and a file hash.

6. The system of claim 1, wherein the command to install the application comprises instructions to install the application within a container of a container application.

7. A method performed by instructions executed in a computing device, the method comprising:

generating a device management console that identifies an application for installation on a client device, wherein the client device comprises a security process that limits the client device to execute trusted code based on a trusted code policy;

unpacking an installation package for the application to identify characteristics of a file within the installation package wherein the installation package comprises a nested package that is unpacked to identify the characteristics of the file, the file being within the nested package;

transmitting, to a management agent executed in the client device, a command to update the trusted code policy, the command to update the trusted code policy comprising instructions to whitelist the file by providing the characteristics of the file to the security process; and transmitting, to the management agent, a command to install the application, wherein the management agent is a trusted installer for the client device.

8. The method of claim 7, further comprising:

identifying, through the device management console, user-defined specifications comprising: an indication to enforce the trusted code policy on the client device, and an indication to permit a management agent to be a trusted installer for the client device.

9. The method of claim 8, further comprising:

transmitting, to a provider computing device associated with a provider of the client device, a command to enforce the trusted code policy on the client device, and a command to permit the management agent to be the trusted installer for the client device, wherein the provider computing device configures the client device to: enforce the trusted code policy, and permit the management agent as the trusted installer.

10. The method of claim 7, further comprising:

identifying, through the device management console, a selection of a set of client devices comprising the client device; and wherein the device management console identifies the application for installation on the set of client devices, the command to update the trusted code policy is transmitted to the set of client devices, and the command to install the application is transmitted to the set of client devices.

11. The method of claim 7, wherein the characteristics of the file to the security process comprise at least one of: a certificate, a file name, a file version, and a file hash.

12. The method of claim 7, wherein the command to install the application comprises instructions to install the application within a container of a container application.

13. A non-transitory computer-readable medium embodying executable instructions, wherein the instructions, when executed by a processor, cause a computing device to at least:

generate a device management console that identifies an application for installation on a client device, wherein the client device comprises a security process that limits the client device to execute trusted code based on a trusted code policy;

unpack an installation package for the application to identify characteristics of a file within the installation package wherein the installation package comprises a nested package that is unpacked to identify the characteristics of the file, the file being within the nested package;

transmit, to a management agent executed in the client device, a command to update the trusted code policy, the command to update the trusted code policy comprising instructions to whitelist the file by providing the characteristics of the file to the security process; and transmit, to the management agent, a command to install the application, wherein the management agent is a trusted installer for the client device.

14. The non-transitory computer-readable medium of claim 13, wherein the instructions, when executed by the processor, cause the computing device to at least:

identify, through the device management console, user-defined specifications comprising: an indication to enforce the trusted code policy on the client device, and an indication to permit a management agent to be a trusted installer for the client device.

15. The non-transitory computer-readable medium of claim 14, wherein the instructions, when executed by the processor, cause the computing device to at least:

transmit, to a provider computing device associated with a provider of the client device, a command to enforce the trusted code policy on the client device, and a command to permit the management agent to be the trusted installer for the client device, wherein the provider computing device configures the client device to: enforce the trusted code policy, and permit the management agent as the trusted installer.

16. The non-transitory computer-readable medium of claim 13, wherein the instructions, when executed by the processor, cause the computing device to at least:

identify, through the device management console, a selection of a set of client devices comprising the client device; and wherein the device management console identifies the application for installation on the set of client devices, the command to update the trusted code policy is transmitted to the set of client devices, and the command to install the application is transmitted to the set of client devices.

17. The non-transitory computer-readable medium of claim 13, wherein the characteristics of the file to the security process comprise at least one of: a certificate, a file name, a file version, and a file hash.

* * * * *